F. SCHREIDT.
FLUID SPRING FOR VEHICLES.
APPLICATION FILED FEB. 20, 1911.
1,025,315.
Patented May 7, 1912.
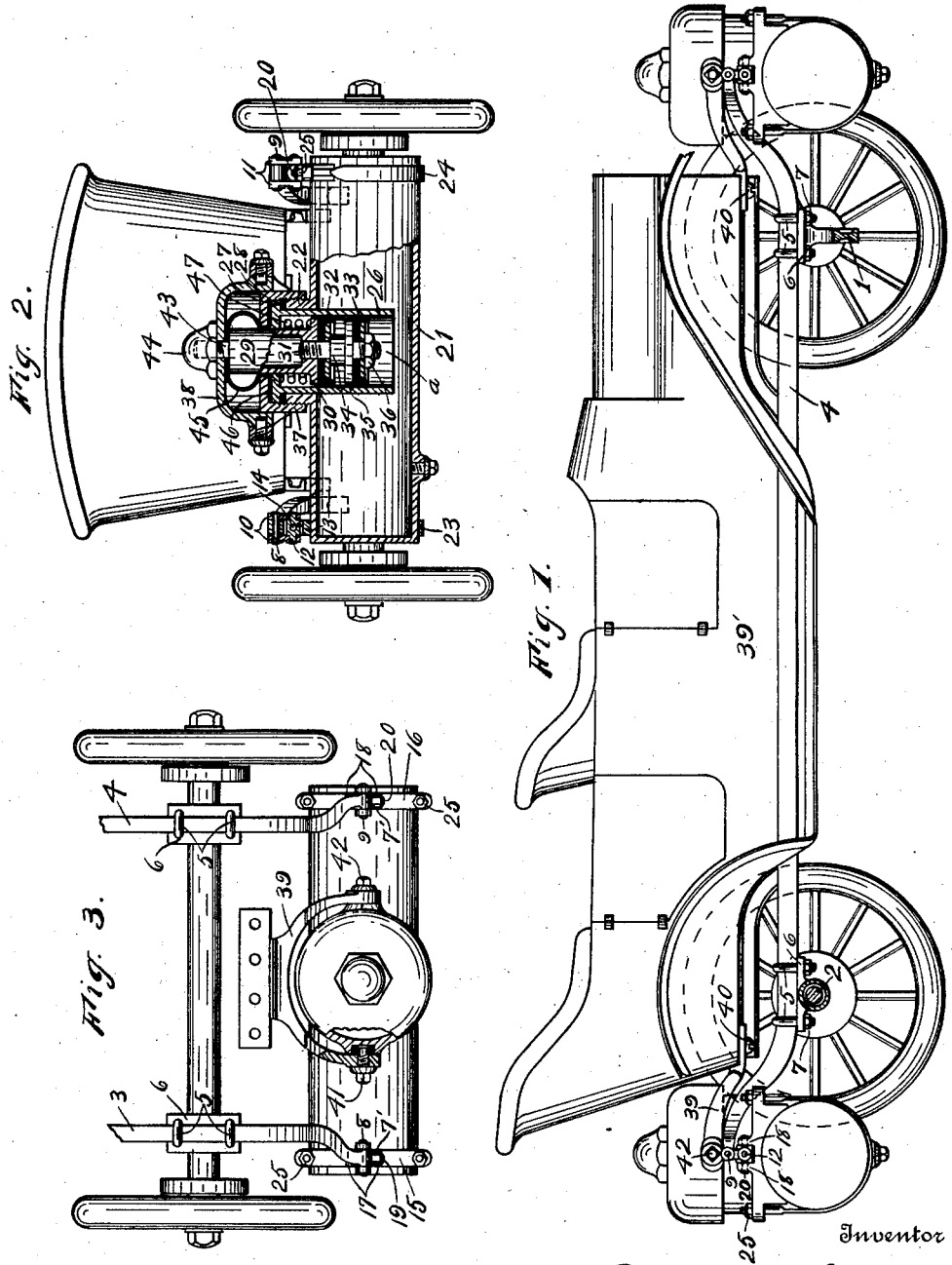
Witnesses
John L. Young.
Pearl M. Cokerman.
Inventor
Frank Schreidt
By John X. Bass
his Attorney

UNITED STATES PATENT OFFICE.

FRANK SCHREIDT, OF MANSFIELD, OHIO.

FLUID-SPRING FOR VEHICLES.

1,025,315.  Specification of Letters Patent.  Patented May 7, 1912.

Application filed February 20, 1911. Serial No. 609,842.

*To all whom it may concern:*

Be it known that I, FRANK SCHREIDT, a citizen of the United States of America, residing at Mansfield, in the county of Richland and State of Ohio, have invented certain new and useful Improvements in Fluid-Springs for Vehicles, of which the following is a specification.

My invention relates to a spring support for the bodies of road vehicles.

The objects of my invention are to provide a vehicle spring that will support the body with uniform resiliency irrespective of any variation of the weight of the body or its contents; to provide means of suspending the spring support and its operating mechanism from the running gear; and to provide means of retaining the operating parts of the spring in a pre-determined position.

The essential features of my invention consist in the application and construction of an atmospheric spring to support vehicle bodies that will diminish concussion and provide uniform resiliency and regularity of motion when the weight of the load carried by the body is either increased or decreased. I accomplish these and other objects by the mechanism described in the specification and illustrated in the accompanying drawing, in which:—

Figure 1 represents a side view of the spring showing its application to an automobile body. Fig. 2 is an end elevation in cross-section of the spring showing the operating mechanism applied to an automobile body. Fig. 3 is a plan view of the spring showing it attached to an axle of an automobile.

In the drawings, reference numerals 1 and 2 represent the forward and rear axles of an automobile and 3 and 4 the supporting bars of the spring. The free ends of the supporting bars extend over the front and rear axles and are bent similar to a goose neck. The supporting bars are rigidly attached to the axles by the clips 5 and brackets 6 and held in place by the nuts 7 which threadably engage the threaded ends of the clips.

Bosses 7' are provided on the extremities of the supporting bars and horizontal apertures are formed therein into which the pivot pins 8 and 9 are inserted pivotally suspending for longitudinal movement the links 10 and 11. The free ends of the links are pivotally connected for longitudinal movement to the studs 12 of the connecting blocks 13. Apertures 14 are formed in the connecting blocks at right angles to the studs 12.

Supporting brackets 15 and 16 are provided with bifurcated portions 17 and 18 into which the block 13 is loosely fitted and pins 19 and 20 pass through the apertures provided in the bifurcated portions 17 and 18 and the apertures 14 of the connecting blocks 13 pivotally suspending the bracket members 15 and 16.

The above describes the means of suspending my spring to the running gear of the vehicle. In the drawing it is shown attached to an automobile. It will be understood, however, that the suspending means and spring can be attached to any other type of road vehicles.

I will now describe my spring: A tank 21 with an exteriorly threaded drum 22 is provided and adapted to be filled with fluid of any kind (preferably compressed air). It is suspended from the supporting bars 3 and 4 by the brackets 15 and 16 and the straps 23 and 24 which pass around part of the circumference of the tank leaving the free threaded ends passing through suitable apertures formed in the brackets. Nuts 25—25 engage the threaded ends of the straps and hold them in place.

A cylinder 26 having a flange 27 is fitted to the inner periphery of the drum 22. An annular washer 28 is interposed between the top of the drum and the bottom of the flange. A piston rod 29 with an outwardly extending flange 30 is fitted to reciprocate in the cylinder. A stem 31 having both extremities threaded is provided. One end of the stem engages a threaded aperture provided in the piston rod. The stem 31 carries cup shaped pistons 32 and 33 which are held in a pre-determined position on the stem by the enlarged portions 34 and 35 of the stem forming shoulders. A nut 36 engages the other end of the stem and when tightened securely holds the pistons in place on the stem, the bottom of the piston rod providing an abutment for the pistons with the shouldered portion interposed between them.

An annular gland nut 37 interiorly screw-threaded, engages with the exteriorly threaded annular flanged portion 22 inclosing the upper portion or flange 27 of the cylinder. A drum 38 is fitted to reciprocate upon the outer periphery of the gland nut. A spanner bracket 39 is securely attached to the body 39' of the vehicle by bolts 40 or other well known fastening means. The drum 38 is supported by the trunnion bolts 41 and 42, the ends of which extend into suitable threaded apertures formed in bosses provided on each side of the drum in alinement with each other. A stud 43 is provided on the upper end of the piston rod and the threaded end extends through an aperture formed in the center of the drum 38. A nut 44 engages the threaded end of the stud and when tightened, securely connects the piston rod, stem and pistons to the drum 38. When movement is imparted to the body of the vehicle, the drum and the parts connected thereto reciprocate together over the periphery of the gland nut 37.

A yielding diaphragm 45 is provided with a central aperture into which the stud 43 is inserted and when the nut 44 is tightened, compresses the diaphragm between the drum and the top of the piston rod providing a liquid or fluid tight joint. The lower portion 46 of the diaphragm is securely held in place between the face of the flange 27 of the cylinder and the annular gland nut 37, and when the gland nut is tightened forms a liquid or fluid tight joint.

In the drawings, I have shown compressed air applied to my invention to provide elastic force to yieldingly support the body, but I do not confine my invention to compressed air as other fluids may be used without departing from my invention.

The operation of my device using compressed air for the elastic or resilient support, is as follows: Compressed air is forced into the tank 21 and the air passes into the open end (a) of the cylinder and exerts its force against the pistons 32 and 33 and in the event of any escape of the air (or other fluid) past the pistons, it is held within the yielding diaphragm 45 thus effectually cutting off the fluid that escapes around the pistons.

It will be noted that escape of air or other fluid from the tank is practically eliminated by the pistons and the yielding diaphragm which coöperate together to prevent the escape of air or other fluid. When the load is decreased, the coil spring 47 prevents the sudden or violent rebound of the drum and the parts connected thereto.

Having fully described my invention, what I claim is:—

1. In a fluid spring for vehicles, the combination with an axle, of a receptacle for fluid, overhanging bars fastened by clips to the axle to suspend said receptacle from the axle, reciprocating means provided on said receptacle and adapted to be directly supported by the fluid in the receptacle and means pivotally connected to said reciprocating means and rigidly to the body whereby the body is supported and given a uniform resilient movement although the weight carried by the body is changed.

2. In a fluid spring for vehicles, a tank for fluid having an annular flanged portion, a gland threadably connected to said flanged portion, means to suspend said tank from the running gear, a cylinder fitted to said tank with the open end depending therein, pistons mounted in said cylinder and adapted to be directly supported by the fluid in the tank and means pivotally connected to said reciprocating means and rigidly to the body whereby the body is supported and given a uniform yielding movement without concussion.

3. In a fluid spring for a road vehicle, the combination of axles with overhanging supporting bars fastened thereto; of a tank suspended from said overhanging supporting bars, a cylinder depending in said tank, pistons to reciprocate in the cylinder and adapted to be directly supported by the fluid therein, said pistons movably suspending the body of the vehicle.

4. In a fluid spring for road vehicles, the combination of supporting bars and axles; of a tank suspended from said supporting bars provided with a flanged portion, a cylinder fitted to the inner periphery of said flanged portion, pistons to reciprocate in the cylinder directly supported by the fluid in the tank, a stem attached to said pistons, a piston rod, a drum attached to said piston rod, means to retard the rebound of the pistons, a diaphragm operating with the pistons between the inner periphery of the drum and top of the gland nut to prevent leakage past the rod.

5. In a fluid spring for road vehicles, the combination of overhanging supporting bars and axles of a vehicle; of a tank provided with a flanged portion suspended from said supporting bars, a cylinder fitted to the inner periphery of said flanged portion, a movable drum, pistons adapted to reciprocate in the cylinder, means to connect the drum to the body of the vehicle, a stem attached to said pistons and carried by the drum, said pistons being directly supported by fluid in the tank and means to movably suspend said body from the movable drum as described and set forth.

6. In a fluid spring for road vehicles, the combination of supporting bars and axles of a vehicle, a tank suspended from said supporting bars, a cylinder mounted on said tank, a gland nut inclosing the head of said cylinder, pistons to reciprocate in the cylinder and supported by fluid in the tank, a piston rod, a drum carried by the rod, a stem attached to said piston and the rod, a diaphragm interposed between the drum surrounding the piston rod and adapted to prevent leakage past the rod.

7. A fluid spring for vehicles comprising in combination, a tank, a cylinder mounted on said tank to depend into the chamber of said tank, pistons fitted to reciprocate in said cylinder and adapted to be directly supported by the fluid in said tank, movable means connected to said pistons and means pivotally attached to said movable means and rigidly attached to the body of the vehicle whereby the body is resiliently supported.

In testimony whereof I affix my signature in presence of two witnesses.

FRANK SCHREIDT.

Witnesses:
　JOHN H. COSS,
　PEARL M. ACKERMAN.

---

Copies of this patent may be obtained for five cents each, by addressing the "Commissioner of Patents, Washington, D. C."